(12) United States Patent
Sheng

(10) Patent No.: US 6,665,101 B1
(45) Date of Patent: Dec. 16, 2003

(54) DUAL OPTICAL MODULE SCANNING MECHANISM

(75) Inventor: Thomas Sheng, Hsinchu (TW)

(73) Assignee: Avision Inc., Hsin-Chu (TW)

( * ) Notice: Subject to any disclaimer, the term of this patent is extended or adjusted under 35 U.S.C. 154(b) by 21 days.

(21) Appl. No.: 09/613,801

(22) Filed: Jul. 11, 2000

(30) Foreign Application Priority Data

Aug. 12, 1999 (TW) ........................................ 88113920 A

(51) Int. Cl.$^7$ ............................ G02B 26/08; H04N 1/04
(52) U.S. Cl. ........................ 359/196; 359/198; 359/201; 358/474; 358/494; 358/497
(58) Field of Search ................................ 359/198, 201, 359/196; 358/474, 483, 494, 497, 296; 399/211, 212

(56) References Cited

U.S. PATENT DOCUMENTS

| | | | | |
|---|---|---|---|---|
| 3,752,558 A | * | 8/1973 | Lloyd | ........................ 359/198 |
| 4,708,486 A | * | 11/1987 | Watanabe | ................... 358/497 |
| 4,952,011 A | * | 8/1990 | Ishii et al. | .................. 359/198 |
| 5,831,749 A | * | 11/1998 | Tseng et al. | ................ 358/474 |
| 6,404,529 B1 | * | 6/2002 | Chang | ........................ 359/196 |

* cited by examiner

Primary Examiner—James Phan
(74) Attorney, Agent, or Firm—H. C. Lin Patent Agent

(57) ABSTRACT

Two optical modules with reflecting mirrors provide two moving speeds so as to maintain a constant light path between the scanned image and the image sensor. One of the optical modules, the first module, is mounted with two driving wheels. One driving wheel rubs against a stretched belt to move the first module in one direction. The second driving wheel pulls the second optical module toward or away from the first optical module by means of a second belt which is connected to two sides of the second optical module and loops around the second driving wheel. When the two driving wheels rotate in the same direction, the second optical module moves a half as fast as the first optical module. When the two driving wheels rotate in opposite direction, the second optical module moves twice as fast as the first optical module. Thus, two different moving speeds of the modules are achieved.

12 Claims, 3 Drawing Sheets

DUAL OPTICAL MODULE SCANNING MECHANISM

BACKGROUND OF THE INVENTION (1) Field of the Invention

The invention relates to a mechanism for an optical system, in particular to an optical system in a scanner.

(2) Description of the Related Art

In a typical scanner, two moving optical modules mounted with reflecting mirrors are used. The scanning light source is placed in one module. The scanning light ray is reflected by a mirror in the second module before incidence on a light sensor fixed on the frame of the scanner. Both modules are moving along the same track. It is desirable to maintain a fixed optical path between the light source and the sensor. This can be accomplished by moving both modules together, but with different speed. A speed ratio of 1:2 is often chosen. The difference in speed is obtained by choosing different diameters of the rollers driving the conveying belt for the two optical modules.

In a traditional scanner, the motor for driving the optical module is mounted on the frame of the scanner. When the driving motor is in operation, the motion may cause vibration of the frame of the scanner and create a great deal of noise. Such a noise is undesirable.

It is also desirable to miniaturize the size of a scanner.

SUMMARY OF THE INVENTION

An object of this invention is to reduce the noise of the dual speed modules. Another of this invention is to reduce the thickness and hence the size of a scanner with dual speed modules.

These objects are achieved by mounting the driving motor on one of the modules on the same moving carriage. Since the motor is not directly mounted on the frame, the frame does not vibrate as violently and the noise is reduced. In addition, by not mounting the motor on the frame, no space need be allowed for the motor in the vertical direction. Thus the frame of the scanner can be thinner and hence smaller.

Two moving optical modules are used. One of the moving optical modules, the first module, has two driving wheels. One of the wheels rubs against a first belt stretched between two opposite walls of the scanner frame. When this wheel turns in a clockwise direction, the friction causes this first module to move toward the right hand direction.

The second optical module is pulled by a second belt by the second driving wheel toward the first optical module by means of a second belt which loops from one side of the second optical module through the second driving wheel to the other side of the second optical module. When the second driving wheel rotates in the same clockwise direction as the first driving wheel, the second optical module tends to move toward the left side but is overcome by right side pull of the first optical module. The net pull results in a reduced speed right hand movement of the second optical module.

On the other hand, when the second driving wheels rotates in an opposite direction (i.e. counter-clockwise direction) to the first driving wheel, the second optical module moves twice as fast as the first optical module. Thus, the two optical modules move in different speed.

DETAILED DESCRIPTION OF THE INVENTION

In a dual-module optical system for a scanner, there are one higher speed module and a slower speed module. The typical speed ratio of the higher speed and the slower speed is 2:1. The reason for the dual speed is to maintain a fixed distance between the image and the image sensor while scanning.

Figure 1:
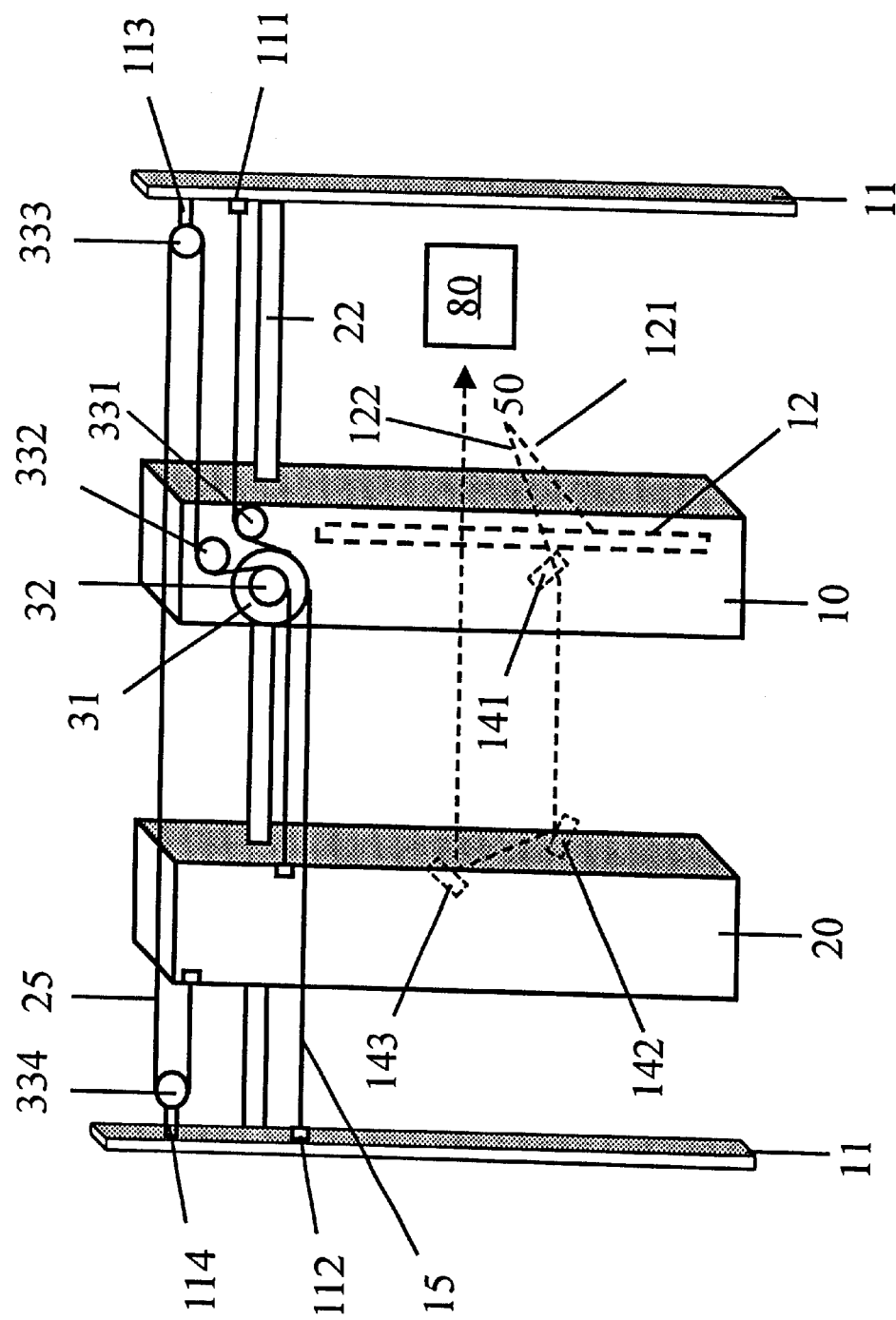
FIG. 1 shows the different components of the present invention including two moving optical modules.

FIG. 1 shows the bottom view of the present invention looking upward from the bottom of the scanner. The scanned document 50 is placed in the opposite direction.

There are two moving modules for scanning, the higher speed module 10 and the slower speed module 20. The higher module 10 has a light source 12, a first reflecting mirror 141. The slower module 20 has a second reflecting mirror 142 and the third reflecting mirror 143 for reflecting the light ray to sensitize the image sensor 80. The image sensor 80 is mounted on the bottom of the frame next to the higher speed module 10. The typical speed ratio is 2:1.

The light source 12 in the module 10 emits a light ray 121 to scan the image 50. The reflected ray 122 is reflected several more times by the mirrors 141, 142 and impinges on the image sensor 80 for further signal processing.

The higher speed module 10 has a first driving wheel 31 capable of driving a belt 15. The second driving wheel 32, concentric with wheel 31 but with a smaller diameter (typically one-half), can drive a second belt 25. When the first driving wheel 31 drives in a clockwise direction, the higher speed module 10 moves toward the right side. If the second wheel 32 is not driven (i.e. idle), the slower module 20 also moves with the same speed as the higher speed module toward the right side when the driving wheel 31 is driven in the clockwise direction.

If the higher speed module is not moving, and the second wheel 32 turns in the clockwise direction, the slower module 20 moves toward the left side.

The first idler 331 coordinates with the first driving wheel 31 to increase the tension of the belt 15 and hence the friction between the driving wheel 31 and the belt 15. The second idler 332 coordinates with the driving wheel 32 to increase the friction between the tension of the belt 25 and hence the friction between the driving wheel 32 and the belt 25, so that the slower module 20 is dragged by the faster module 10 to move in the same direction.

The two ends 111 and 112 of the belt 15 are fixed to the side wall 11 of the fame. The ends of the belt 25 are fixed on the two sides of the slower module 20. The belt 25 loops through the second driving wheel 32 and two idlers 333 and 334 which are fixed to the side wall of the frame with two fixtures 113 and 114.

Figure 2:
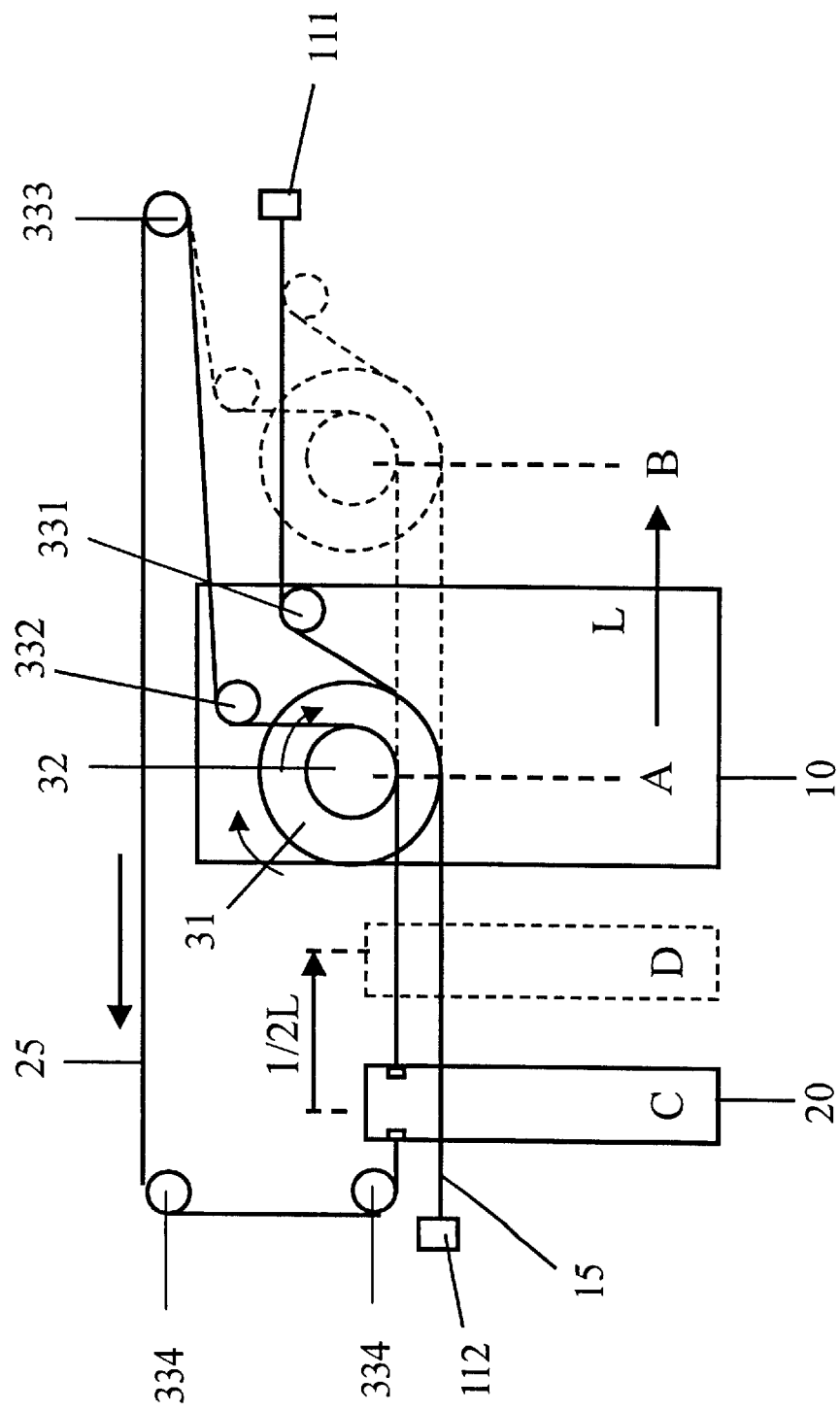
FIG. 2 shows how two driving wheels can slow down one of the two moving modules.

FIG. 2 illustrates the movement of the higher speed module 10. Two idlers 334 are illustrated for clarity of viewing and ease of understanding. In practice, only one idler is used. When the driving wheel 31 turns in the clockwise direction, the friction between the wheel 31 and the belt propels the fast module toward the right side, say from position "A" to position "B" by a distance "L". Meanwhile, as the second driving wheel 32 with one half of the diameter of the driving wheel 31 is driven in the clockwise direction, belt 25 (shown in FIG. 1) tends to move the slower module 20 toward the left side at a slower speed. However, the module 20 is also pulled by the module 10 toward the right side. Since the module 10 moves at a higher speed toward the right side than the slower speed toward the left side, the result of the opposite forces moves the module at a reduced speed from position "C" to position "D" by one half of the distance L. Thus, a 2:1 speed ratio is achieved.

Figure 3:
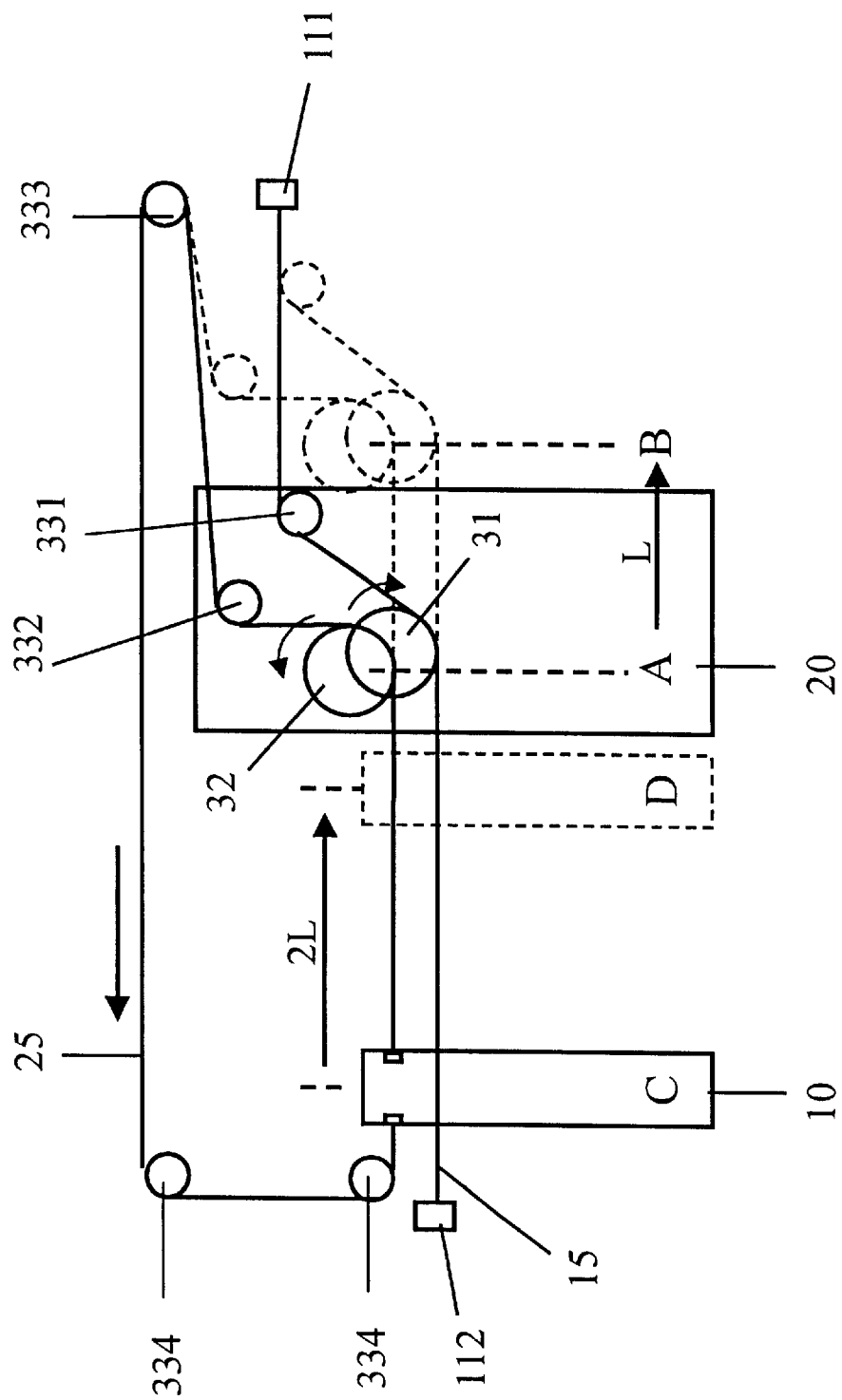
FIG. 3 shows how two driving wheels can speed up one of the two moving modules.

FIG. 3 shows another embodiment of the present invention in which the driving wheel 31 and the driving wheel 32 rotate in opposite directions. These two wheels are mounted on a slower moving module 20 and typically have the same diameter. The optical system is similar to that in FIG. 2 and is not shown in this figure. The driving wheel 31 is in contact with the belt 15, which is stretched between fixtures 111 and 112 fixed on the side walls of the scanner and is tightened by the idler 331 to increase the friction between the driving wheel 31 and the belt 15. When the drive wheel 31 rotates in a clockwise direction, the reaction between the driving wheel 31 and the fixed belt moves the module 20 toward the right side from position "A" to position "B" by a distance, say "L". The driving wheel 32 drives another belt 25 with both ends fastened to a slower module 10. The belt is tightened by the idlers 332 on module 20 and other idlers 333 and 334 fixed to the walls of the scanner. When the drive wheel 32 rotates in a counterclockwise direction, the belt 25 pulls the module 10 toward the right side. Since the axis of the drive wheel 31, which is mounted on the module 20, is also moving toward the right side, the double motion due to the drive wheel 31 and the drive wheel 32 moves the module 10 faster than the moving module 20 from position "C" to position "D" by a distance 2L. Thus a dual speed module is achieved.

While belts are used as conveyers of the modules in the foregoing descriptions, it should be pointed out the conveyers are not limited to belts. Belts and wheels with teeth, rollers and steel wires, wheels and nylon threads, etc. may also be used as conveyers.

While particular embodiments of the invention have been described, it will be apparent to those skilled in the art that various modifications may be made in the embodiments without departing from the spirit of the present invention. Such modifications are all within the scope of this invention.

What is claimed is:

1. A driving mechanism for a scanning optical system housed in a scanner frame, comprising:
   a first optical module for scanning a document having:
      a light source for generating a light ray to illuminate said document and a first mirror for reflecting the reflected light ray from said document to form a second light ray,
      a first driving wheel for said first optical module, and
      a second driving wheel;
   a first conveyer stretched between two points on opposite side walls of said scanner frame and linked with said first driving wheel;
   a second optical module having at least a second mirror for reflecting the second light ray toward an image sensor, and
   a second conveyer fastened to two opposite sides of said second optical module, driven by said second driving wheel, pulling said second optical module toward said first optical module when the first driving wheel and the second driving wheel rotates in the same angular direction such that said first optical module moves at twice the speed of said second optical module.

2. A driving mechanism as described in claim 1, wherein said first conveyer and said second conveyer are selected from the group consisting of: a belt engaging a driving wheel, a toothed belt engaging a toothed driving wheel, a steel wire engaging a toothed driving wheel, and a nylon thread engaging a driving wheel.

3. A driving mechanism as described in claim 1, wherein said first driving wheel and said second driving wheel are concentric.

4. A driving mechanism as described in claim 1, further comprising a first idler mounted said first said optical module for tightening said first conveyer.

5. A driving mechanism as described in claim 1, further comprising a second idler mounted on said optical module, and a third and fourth idlers fastened on two opposite side walls of said scanner frame for tightening said second conveyer.

6. A driving mechanism as described in claim 1, wherein said first driving wheel and said second driving wheel are of different diameters.

7. A driving mechanism as described in claim 6, wherein the diameter of said first driving wheel is twice as large as the diameter of said second driving wheel.

8. A driving mechanism for a scanning optical system housed in a scanner frame, comprising:
   a first optical module for scanning a document having:
      light source for generating a light ray to illuminate said document and a first mirror for reflecting the reflected light ray from said document to form a second light ray;
      a first driving wheel for said first optical module;
      a second driving wheel;
   a first conveyer stretched between two points on opposite side walls of said scanner frame and in friction contact with said first driving wheel;
   a second optical module having at least a second mirror for reflecting the second light ray toward said image sensor; and
   a second conveyer fastened to two opposite sides of said second optical module, driven by said driving wheel, pulling said second optical module away from said first optical module when said first driving wheel and said second driving wheel rotate in opposite angular direction whereby said first optical module moves slower than said second optical module such that said first optical module moves at one half the speed of said second optical module.

9. A driving mechanism as described in claim 8, wherein said first conveyer and said second conveyer are selected from the group consisting of: a belt engaging a wheel, a toothed belt engaging a toothed wheel, a steel wire engaging a wheel, and a nylon thread engaging a wheel.

10. A driving mechanism as described in claim 8, further comprising a first idler mounted said first said optical module for tightening said first conveyer.

11. A driving mechanism as described in claim 8, further comprising a second idler mounted on said optical module, and a third and fourth idlers fastened on two opposite side walls of said scanner frame for tightening said second conveyer.

12. A driving mechanism as described in claim 8, wherein the diameter of said driving wheel is the same as the diameter of said second driving wheel.

* * * * *